United States Patent
Cable et al.

(10) Patent No.: US 6,238,816 B1
(45) Date of Patent: May 29, 2001

(54) METHOD FOR STEAM REFORMING HYDROCARBONS USING A SULFUR-TOLERANT CATALYST

(75) Inventors: Thomas L. Cable, Newbury; Adam B. Brakas, Chesterland; Robert C. Ruhl, Cleveland Heights; Christopher E. Milliken, South Euclid, all of OH (US)

(73) Assignee: Technology Management, Inc., Cleveland, OH (US)

( * ) Notice: Subject to any disclaimer, the term of this patent is extended or adjusted under 35 U.S.C. 154(b) by 0 days.

(21) Appl. No.: 09/231,341

(22) Filed: Jan. 13, 1999

Related U.S. Application Data

(63) Continuation-in-part of application No. 08/777,419, filed on Dec. 30, 1996, now abandoned.

(51) Int. Cl.[7] .................................................. C01B 3/26
(52) U.S. Cl. ........................... 429/17; 252/373; 423/652; 423/653; 423/654
(58) Field of Search .................................. 423/652, 653, 423/654; 252/373; 429/17

(56) References Cited

U.S. PATENT DOCUMENTS

| | | |
|---|---|---|
| 4,060,498 | 11/1977 | Kawagoshi et al. . |
| 4,363,361 | 12/1982 | Madgavkar et al. . |
| 4,371,452 | 2/1983 | Ohsaki et al. . |
| 4,539,310 | 9/1985 | Leftin et al. . |
| 4,693,882 * | 9/1987 | Setzer et al. .................... 423/652 |
| 4,738,946 | 4/1988 | Yamashita et al. . |
| 4,780,449 | 10/1988 | Hicks . |
| 4,793,797 | 12/1988 | Kato et al. . |
| 4,793,904 | 12/1988 | Mazanec et al. . |
| 4,801,573 | 1/1989 | Eri et al. . |
| 4,844,837 | 7/1989 | Heck et al. . |
| 4,962,280 | 10/1990 | Tijburg et al. . |
| 4,968,660 | 11/1990 | Tijburg et al. . |
| 4,988,661 | 1/1991 | Arai et al. . |
| 4,990,481 | 2/1991 | Sato et al. . |
| 5,015,461 * | 5/1991 | Jacobson et al. .................... 423/593 |
| 5,100,857 | 3/1992 | Sato et al. . |
| 5,102,851 | 4/1992 | Eri et al. . |
| 5,108,979 | 4/1992 | Magnabosco et al. . |
| 5,116,879 | 5/1992 | Eri et al. . |
| 5,130,114 | 7/1992 | Igarashi . |
| 5,137,862 | 8/1992 | Mackrodt et al. . |
| 5,246,791 | 9/1993 | Fisher et al. . |
| 5,262,045 | 11/1993 | Rao et al. . |
| 5,268,346 | 12/1993 | Ino et al. . |
| 5,368,835 | 11/1994 | Choudhary et al. . |
| 5,411,927 | 5/1995 | Choudhary et al. . |
| 5,431,855 | 7/1995 | Green et al. . |
| 5,439,861 | 8/1995 | Bhattacharyya et al. . |
| 5,445,903 | 8/1995 | Cable et al. . |
| 5,447,705 | 9/1995 | Petit et al. . |
| 5,496,655 | 3/1996 | Lessing . |
| 5,500,149 | 3/1996 | Green et al. . |
| 5,500,306 | 3/1996 | Hsu et al. . |
| 5,589,285 | 12/1996 | Cable et al. . |
| 5,601,937 | 2/1997 | Isenberg . |
| 5,614,163 | 3/1997 | Bhattacharyya et al. . |
| 5,637,259 | 6/1997 | Galuszka et al. . |
| 5,658,497 | 8/1997 | Kumar et al. . |
| 5,679,614 * | 10/1997 | Bangala et al. .................... 502/302 |
| 5,723,035 | 3/1998 | Mazanec et al. . |

* cited by examiner

*Primary Examiner*—Wayne Langel
(74) *Attorney, Agent, or Firm*—Renner, Kenner, Greive, Bobak, Taylor & Weber

(57) ABSTRACT

A process and apparatus for steam reforming of hydrocarbons, using a sulfur-tolerant catalyst comprising an active phase and a support phase, and optionally a promoter, which provides substantially complete conversion of the hydrocarbon to a mixture of hydrogen, carbon monoxide, and carbon dioxide. The process comprises introducing steam and a hydrocarbon feed containing at least about 2 ppm sulfur species into the apparatus, and reacting said steam and hydrocarbon feed in the catalyst bed.

21 Claims, 2 Drawing Sheets

METHOD FOR STEAM REFORMING HYDROCARBONS USING A SULFUR-TOLERANT CATALYST

CROSS REFERENCE TO RELATED APPLICATIONS

The present application is a continuation-in-part of U.S. Ser. No. 08/777,419, filed Dec. 30, 1996, abandoned.

TECHNICAL FIELD

This invention relates to steam reforming of gaseous or liquid hydrocarbons, and more particularly to steam reforming of sulfur bearing hydrocarbons using a sulfur tolerant steam reforming catalyst.

BACKGROUND OF THE INVENTION

The present invention is directed to catalytic steam reforming of hydrocarbons. More particularly, the present invention is directed to a method for steam reforming of hydrocarbons, especially sulfur-containing hydrocarbons, using a sulfur-tolerant catalyst, and an apparatus therefor.

Steam reforming is a process whereby a hydrocarbon is reacted with high temperature steam to form hydrogen, carbon monoxide, and carbon dioxide. The product gas can be reacted as a fuel or used in chemical processing.

Hydrocarbons which can be reacted according to the present invention include methane, natural gas (including landfill gas) and heavier hydrocarbons (including diesel and jet fuel).

Potential hydrocarbon feeds for the reforming process often contain large quantities of sulfur. Gas oil, for example, may contain as much as 1500 ppm sulfur. As described in greater detail below, reforming of sulfur-containing hydrocarbons can lead to increased expense.

Typically, catalytic steam reforming of natural gas or heavier hydrocarbon feeds is achieved by using a nickel catalyst. However, due to the extreme sensitivity of nickel metal to sulfur-containing compounds, which are a severe poison to the nickel catalyst, the hydrocarbon feed must generally be purified of sulfur, to less than 1 ppm, prior to steam reforming. This requirement results in additional expense for the hydrocarbon steam reforming process. Furthermore, whereas light fractions may be amenable to hydrodesulfurization, desulfurization of heavy fractions is extremely difficult.

An alternative is to use the nickel catalyst for hydrocarbon steam reforming and allow it to be poisoned by the sulfur, but to operate at higher temperatures and with higher volumes of catalyst to counteract the loss of catalyst activity due to poisoning. This alternative also results in additional cost and weight to the process.

A second alternative is to use noble metal catalysts, such as platinum, palladium, or rhodium in place of nickel. While the noble metal catalysts are very active for steam reforming and are somewhat tolerant of sulfur-containing feeds, they are very impractical because of their high cost.

Therefore, a clear need exists for a steam reforming apparatus containing a catalyst which is highly tolerant of sulfur, and which does not add significantly to the cost of using nickel catalysts.

SUMMARY OF THE INVENTION

An object of the present invention is to provide an improved process for steam reforming of sulfur-containing hydrocarbons.

A further object of this invention is to provide a process for steam reforming of hydrocarbons in which sulfur-containing hydrocarbons are available as raw materials without being desulfurized in advance.

Another object of this invention is to provide a process for steam reforming of sulfur-containing hydrocarbons using a catalyst that gives stable performance, substantially without coking, and with substantially complete conversion of heavy hydrocarbon feeds.

A still further object of this invention is to provide an apparatus for the practice of the above steam reforming processes.

We have found a sulfur-tolerant catalyst, useful in the steam reforming of hydrocarbons, comprising an active phase and a support phase, and optionally a promoter, which provides substantially complete conversion of the hydrocarbon to a mixture of hydrogen, carbon monoxide, and carbon dioxide.

The present invention provides a process for steam reforming a sulfur-containing hydrocarbon feed comprising:
  providing a sulfur-tolerant catalyst and contacting the catalyst with a gas stream comprising steam and a sulfur-containing hydrocarbon feed, wherein sulfur species are present in the hydrocarbon feed in an amount of at least 2 ppm;
  the sulfur-tolerant catalyst comprising a mixed oxygen ion conducting and electron conducting material having both an active catalytic phase and a catalyst support phase, and optionally a promoter,
  a) wherein the active catalytic phase is at least one of:
    (I) A metal selected from the group consisting of Ag, Co, Cr, Cu, Fe, Pd, Pt, Ru, Rh, V, and alloys and mixtures thereof;
    (II) An oxide of the general formula $M_yM'_{1-y}O_x$, wherein at least one M element is different than at least one M' element, wherein M is selected from Ba, Ce, Nb, Sm, Sr, and mixtures thereof, M' is selected from Ti, Y, Sm, Nb and mixtures thereof, and wherein $0 \leq y \leq 1$ and x is a number sufficient to satisfy the valence requirements of the other elements; and
    (III) A perovskite of the general formula $(A_{1-a}A'_a)(B_bB'_{1-b})O_{3-c}$, wherein A is selected from lanthanides, La, Y, Pb and mixtures thereof, A' is selected from alkaline earth metals such as Ba, Ca, Sr and mixtures thereof, B is selected from transition elements such as Fe, Co, Cr, Ni and mixtures thereof, and B' is selected from Al, Co, Cr, Mg, Nb, Ti, Zr and mixtures thereof, wherein $0.9 \leq (A+A')/(B+B') \leq 1.1$, preferably $0.99 \leq (A+A')/(B+B') \leq 1.01$; and wherein $0 \leq a \leq 1$; $0 \leq b \leq 1$; and c is a number that renders the composition charge neutral in the absence of an applied potential; and
  b) wherein the catalyst support phase and the optional promoter is at least one of:
    (IV) An oxide of the general formula $Me_zMe'_{1-z}O_x$, wherein at least one Me element is different than at least one Me' element, wherein Me is selected from Group 2a and 3a (IUPAC) metals, lanthanides, Cr, Fe, In, Nb, Pb, Si, Sn, Ta, Ti, and mixtures thereof, Me' is selected from Al, Bi, Ce, In, Th, U, Zr and mixtures thereof, and wherein $0 \leq z \leq 1$ and x is a number sufficient to satisfy the valence requirements of the other elements; and
    (V) A perovskite of the general formula $(D_{1-d}D'_d)(E_eE'_{1-e})O_{3-f}$, wherein D is selected from lanthanides, La, Y, and mixtures thereof, D' is selected from alkaline earth metals such as Ba, Ca, Sr and mixtures thereof, E is selected from Al, Ce, Co, Mg and mixtures thereof, and E' is selected from transition elements such as Co, Cr, Cu, Fe, Ni, Zr and mixtures thereof, wherein $0.9 \leq (D+D')/(E+E') \leq 1.1$, preferably $0.99 \leq (D+D')/(E+E') \leq 1.01$; and wherein $0 \leq d \leq 1$; $0 \leq e \leq 1$; and f is a number that renders the composition charge neutral in the absence of an applied potential;

(VI) A fluorite structure material of the general formula $Ma_{(1-g-h)}Ma'_gMa''_hO_2$ wherein Ma is Th, Zr, Ce, or a rare earth element, Ma' is Sc, Ti, Ta or an alkaline earth such as Ca, Sr, Ba, or Mg, Y or a rare earth element different from Ma, wherein $0<g<0.5$, Ma'' is La, Pr, Nd, or Sm, and wherein $0<h<0.2$;

(VII) A pyrochlore structure material of the general formula $Mb_2Mb'_{(2-k)}Mb''_kO_7$ wherein Mb is Ga, or Gd, a rare earth element such as La, Y, or Sm, Mb' is Zr, a transition metal element such as Mo, Ti, Fe, an alkaline earth element such as Ca, Sr, Ba or Mg, wherein $0<k<0.5$, and wherein Mb'' is a transition metal element different from Mb', such as Mo, Ti, Zr, or Fe;

(VIII) A Brown-Millerite material of the general formula $Mc_2Mc'_2O_5$ wherein Mc is an alkaline earth element such as Ba or Sr, and Mc' is Gd, Dy or Ga.

The present invention further provides an apparatus comprising a reaction zone, a catalyst bed contained within the reaction zone, and wherein the above sulfur-tolerant catalyst is included in the catalyst bed. The catalyst bed is preferably a fixed bed.

The present invention therefore also provides a process for steam reforming a sulfur bearing hydrocarbon feed, such as in a steam reforming apparatus containing a bed of the sulfur-tolerant catalyst, including introducing steam and a hydrocarbon feed containing at least about 2 ppm sulfur species into the apparatus, and reacting said steam and hydrocarbon feed in the catalyst bed.

DETAILED DESCRIPTION OF THE INVENTION

Figure 1:
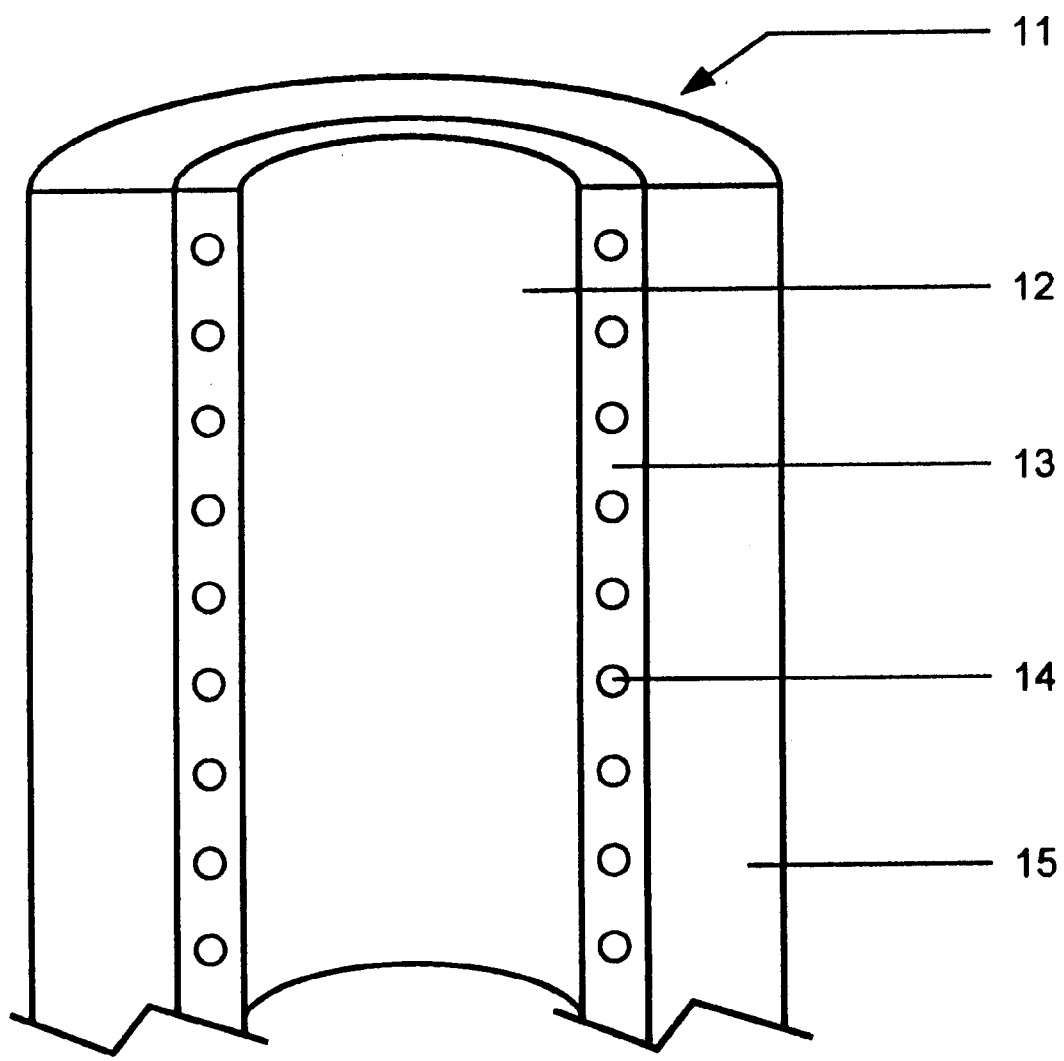
FIG. 1 is a cross-section elevational view showing a heating jacket according to the present invention.

We have found sulfur-tolerant catalysts useful in the steam reforming of hydrocarbons, which provide stable performance, substantially without coking, and with substantially complete conversion of hydrocarbon feeds, including heavy hydrocarbons and distillate fuels.

By "sulfur tolerant" catalyst is intended to mean one which maintains a substantially stable operating performance after equilibration, during and after exposure to sulfur-bearing hydrocarbons.

In a preferred embodiment of the invention, the sulfur-tolerant catalyst useful for the steam reforming of hydrocarbons comprises an active catalytic phase set forth in formulas I, II, and III of Table A, and a catalyst support, and optionally a promoter, phase set forth in formulas IV, V, VI, VII and VIII of Table A.

Table A

Active Catalyst Phase (I) Metals such as Ag, Co, Cr, Cu, Fe, Pd, Pt, Ru, Rh, V, and the like, and alloys and mixtures thereof;

(II) Oxides of the general formula $M_yM'_{1-y}O_x$, wherein at least one M element is different than at least one M' element, wherein M is selected from Ba, Ce, Nb, Sm, Sr, and mixtures thereof, M' is selected from Ti, Y, Sm, Nb and mixtures thereof, and wherein $0 \leq y \leq 1$ and x is a number sufficient to satisfy the valence requirements of the other elements;

(III) Perovskites of the general formula $(A_{1-a}A'_a)(B_bB'_{1-b})O_{3-c}$, wherein A is selected from lanthanides, La, Y, Pb and mixtures thereof, A' is selected from alkaline earth metals such as Ba, Ca, Sr and mixtures thereof, B is selected from transition elements such as Fe, Co, Cr, Ni and mixtures thereof, and B' is selected from Al, Co, Cr, Mg, Nb, Ti, Zr and mixtures thereof, wherein $0.9 \leq (A+A')/(B+B') \leq 1.1$, preferably $0.99 \leq (A+A')/(B+B') \leq 1.01$; and wherein $0 \leq a \leq 1$; $0 \leq b \leq 1$; and c is a number that renders the composition charge neutral in the absence of an applied potential;

Catalyst Promoters and/or Support Phase (IV) Oxides of the general formula $Me_zMe'_{1-z}O_x$, wherein at least one Me element is different than at least one Me' element, wherein Me is selected from Group 2a and 3a (IUPAC) metals, lanthanides, Cr, Fe, In, Nb, Pb, Si, Sn Ta, Ti, and mixtures thereof, Me' is selected from Al, Bi, Ce, In, Th, U, Zr and mixtures thereof, and wherein $0 \leq z \leq 1$ and x is a number sufficient to satisfy the valence requirements of the other elements;

(V) Perovskites of the general formula $(D_{1-d}D'_d)(E_eE'_{1-e})O_{3-f}$, wherein D is selected from lanthanides, La, Y, and mixtures thereof, D' is selected from alkaline earth metals such as Ba, Ca, Sr and mixtures thereof, E is selected from Al, Ce, Co, Mg and mixtures thereof, and E' is selected from transition elements such as Co, Cr, Cu, Fe, Ni, Zr and mixtures thereof, and, wherein $0.9 \leq (D+D')/(E+E') \leq 1.1$, preferably $0.99 \leq (D+D')/(E+E') \leq 1.01$; and wherein $0 \leq d \leq 1$; $0 \leq e \leq 1$; and f is a number that renders the composition charge neutral in the absence of an applied potential;

(VI) A fluorite structure material of the general formula $Ma_{(1-g-h)}Ma'_gMa''_hO_2$ wherein Ma is Th, Zr, Ce, or a rare earth element, Ma' is Sc, Tl, Ta or an alkaline earth such as Ca, Sr, Ba, Mg, Y or a rare earth element different from Ma, wherein $0<g<0.5$, Ma'' is La, Pr, Nd, or Sm, and wherein $0<h<0.2$;

(VII) A pyrochlore structure material of the general formula $Mb_2Mb'_{(2-k)}Mb''_kO_7$ wherein Mb is Ga, or Gd, a rare earth element such as La, Y, or Sm, Mb' is Zr, a transition metal element such as Mo, Ti, Fe, an alkaline earth element such as Ca, Sr, Ba or Mg, wherein $0<k<0.5$, and wherein Mb'' is a transition metal element different from Mb', such as Mo, Ti, or Fe;

(VIII) A Brown-Millerite material of the general formula $Mc_2Mc'_2O_5$ wherein Mc is an alkaline earth element such as Ba or Sr, and Mc' is Gd, Dy or Ga.

The rare earth of formulas (VI) and (VII) is preferably Gd, and the transition metal element of formula (VII) is preferably Ti.

The sulfur-tolerant catalyst used in the inventive process comprises a mixed oxygen ion conducting and electron conducting material, in addition to its having both an active catalytic phase and a catalyst support phase. Generally, the materials set forth in formulas (I), (II), and (III), of Table A are electronic conductors, and the materials set forth in formulas (IV), (V), (VI), (VII), and (VIII) of Table A are ionic or mixed ionic/electronic conductors. These characteristics are postulated to be related to both the catalytic activity of the materials for hydrocarbon steam reforming as well as their sulfur tolerance.

The catalyst is prepared by optionally first preparing a promoter, in an embodiment utilizing a promoter compound, preferably in powder form. A catalyst support, also in powder form, is mixed with the promoter, if any, and calcined. The resultant powder is then mixed with the active phase of the catalyst. Finally, the mixture, containing the respective electron conducting and oxygen ion conducting materials, is extruded and cut to an appropriate size.

It is preferred for porosity to be provided in the support as interconnected porosity so as to permit the flow of gas through the material. The interconnected porosity can be made by the preparation of a green body of precursors to the catalyst support into which green body has been incorporated a thermoset or thermoplastic binder and a pore former such as wax or a salt, for example calcium chloride. After the formation of the green body, the pore former is dissolved out of the green body by heating or by immersion in a solvent for the pore former, leaving an interconnected pathway of voids in the material which can then be fired by conventional procedures. A method for forming interconnected porosity in a ceramic body is disclosed in U.S. Pat. No. 5,028,036, which is incorporated herein by reference as if fully written out below.

Alternate methods of forming the interconnected porosity within the catalyst support include the use of woven sintered ceramic fibers, or pressed ceramic particles. In the latter method, it is necessary to use particle sizes which are large, in the range of about 40 mesh to 80 mesh (0.177–0.42 mm), and in which there are not a significant amount of smaller sized particles present, which could block the pores between the larger particles. Where a particulate support is used, interconnected porosity can still be considered to be fixed if the particle size range is such that small particles do not block pores, and the shifting of large particles into a pore or a passageway between pores creates a shifted void that reestablishes an interconnection to the same or another pore.

In a method related to the pore forming method, a reticulated foam is used as a substrate for the deposition of a catalyst support to form a precursor, and then the foam is dissolved to form the interconnected pores.

The process of the present invention is highly flexible with respect to the hydrocarbon feed source, as the subject catalyst is suitable for the utilization of gaseous hydrocarbon sources such as natural gas, sometimes having sulfur species present in amounts of up to 10 ppm (volume) or more, landfill methane gas having sulfur species present in amounts of 25 to 75 ppm or more, hydrocarbon fuels, such as coal derived fuel gas having sulfur present in amounts up to 1000 ppm or more, and fuel gas from liquid fuels such as diesel and jet fuels having sulfur species present in amounts of up to 0.5 percent by weight. Stable performance of the catalyst has been realized, even with feeds having 2000 ppm (volume in gas feed) sulfur species. The process and apparatus, according to the invention, may therefore utilize any of the above feeds, as well as clean fuels, interchangeably.

Figure 2:
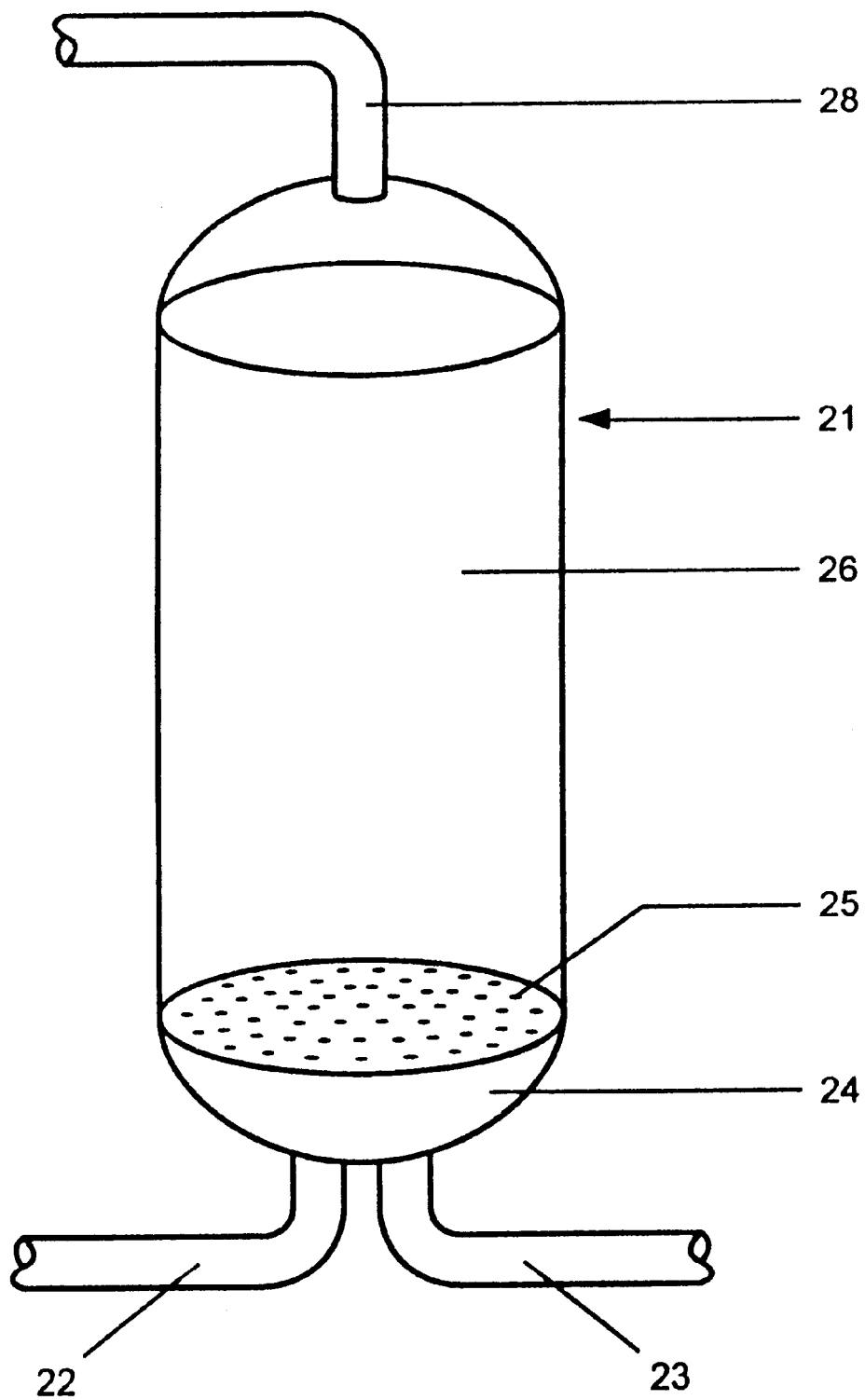
FIG. 2 shows a reaction vessel according to the present invention.

One embodiment of the steam reforming apparatus for carrying out the present invention comprises a heating jacket 11 (FIG. 1) and a reaction vessel 21 (FIG. 2). FIG. 1 is a cross section elevational view showing that the heating jacket 11 consists of a reaction zone 12, immediately surrounded by a heating zone 13 containing heating coils 14. The heating zone is substantially surrounded by an outer insulating wall 15. FIG. 2 shows the reaction vessel which is positioned inside the reaction zone 12. A steam feed line 22 and a hydrocarbon feed line 23 empty into a premix zone 24. Above the premix zone 24, separated by an orifice 25, is the catalyst bed 26 (catalyst not shown). The catalyst bed may contain an inert material, such as alumina, in addition to the catalyst, to contain the fine particles in the catalyst bed. The gaseous products of the steam reforming reaction are collected from the reaction vessel by a product outlet line 28.

The process for steam reforming sulfur bearing hydrocarbons includes providing the sulfur-tolerant catalyst. The catalyst is positioned in the reaction vessel, optionally together with an inert material such as alumina. The reaction vessel is positioned inside the heating jacket.

The premix zone is fed by liquid water or steam and by a liquid or gaseous hydrocarbon feed. The premix zone is heated to a temperature sufficient to completely vaporize all liquids fed. The resulting vapors and/or gases mix thoroughly as they pass through the orifice into the catalyst chamber.

The catalyst bed is heated to a relatively high temperature where both the catalyst activity is high and the chemical reaction equilibria for the reforming reactions are favorable. A temperature gradient will naturally exist within the bed, with the feed end being cooler. The height-to-diameter ratio of the bed should be sufficiently large so that flow "channeling" does not occur.

The gaseous products leaving the catalyst bed will consist primarily of hydrogen, steam, carbon monoxide, and carbon dioxide. The sulfur will be present chiefly as hydrogen sulfide. Small percentages of other species (including methane) will also be present, depending upon the bed exit pressure, temperature, and residence time. The apparatus may be operated at various pressures (ranging from subatmospheric to many atmospheres), exit temperatures, and residence times, depending primarily upon the requirements for the product gas. The selection of pressure and temperature will affect the chemical equilibria in well-known manners. The selection of temperature and space velocity will affect the reaction kinetics and hence the approach to equilibrium. We have used a 1000° C. exit temperature for most experimental trials but the catalysts of the present invention will perform well down to 850° C. or lower. We have performed most experimental trials at exit pressures from 0 to 10 psig, but the process of the present invention will also work both at lower and at much higher pressures.

The ratio of oxidizing species (steam and carbon dioxide) to the carbon contained in the hydrocarbon feed must be high enough to prevent solid carbon "coke" deposition in the catalyst bed. Good reforming catalysts, such as those of the present invention, can operate at lower ratios of oxidizing species than poor catalysts, especially in the presence of sulfur.

EXAMPLE A

One preferred embodiment of the sulfur-tolerant catalyst used in the process of the present invention includes a catalyst supported on a support compound, promoted with a promoter compound. Examples of suitable catalysts, promoters and supports are listed in Table B.

TABLE B

| Catalyst | Promoter | Support |
| --- | --- | --- |
| Ag | $Bi_2O_3$ | $CeO_2$ |
| Co | CaO | Mullite |
| Cu | $La_2O_3$ | $ZrO_2$ |
| Fe | MgO | |
| Pd | $Pr_6O_{11}$ | |
| Pt | | |
| V | | |

To demonstrate the process of the invention, catalysts represented by Table B were fabricated by first preparing the promoted support in powdered form. A support compound powder was thoroughly mixed with the promoter compound powder by ball milling, followed by calcination of the powder at 1450° C. for two hours. The resultant ceramic powder was then mixed with a powder of the catalyst by milling. The powder of the catalyst/promoter/support were mixed with pore formers and binders and extruded to form long strands. The extruded strands were then cut to produce small cylinders approximately 1/16" outer diameter (O.D.) by 4 cm long. The cylinders were then calcined at 1200–1400° C. to form the final catalyst extrudates.

Catalysts of Example A were tested for steam reforming on distillate fuels, namely JP-8 jet fuel and DF-2 diesel fuel. The catalysts exhibited stable performance (demonstrating no increase in catalyst bed pressure) for up to 500 hours. The test conditions are shown in Table 1 for experimental runs with DF-2 diesel and JP-8 jet fuels. No coking was observed.

TABLE 1

Reforming Test of Sulfur-Tolerant Catalyst

| Reactor Conditions | Example 1 | Example 2 |
| --- | --- | --- |
| Fuel | DF-2 diesel fuel | JP-8 jet fuel |
| Fuel Flow (ml/hr) | 6.1 | 6.8 |
| $H_2O/C$ ratio | 3.8 | 4.7 |
| Residence Time (ms) | 1654 | 1182 |
| Bottom Temp. (° C.) | 370 | 360 |
| Top Temp. (° C.) | 1000 | 1000 |
| Exit Pressure (psig) | 0 | 0 |
| Run Time (Hours) | 276 | 504 |
| Coke | None | None |

EXAMPLE 3

In the reforming of DF-2 diesel fuel with the above prepared sulfur-tolerant catalysts, the chemical composition of the product gas was measured and is shown in Table 2. The product gas was passed through a cold trap to remove water prior to injection into the gas chromatograph. For this example, the reaction condition included a steam to hydrocarbon volume ratio of 3.6, residence time of 1646 ms, and fuel flow of 6.3 ml/hr.

TABLE 2

Dry Gas Analysis for Reformed Diesel Fuel*

| Compound | Volume % |
| --- | --- |
| $H_2$ | 63.2 |
| CO | 16.0 |
| $CO_2$ | 19.9 |
| $CH_4$ | 0.9 |

A series of tests was run on the stream reforming of JP-8 jet fuel using the inventive catalyst, and the results are reported in Table 3, below.

TABLE 3

Steam Reforming of Jet Fuel Containing 0.3 weight % Sulfur

| Example | Duration (hr) | HC Flow (ml/hr) | Catalyst ($cm^3$) | Catalyst (g) | HC Space Velocity (ml/hr)/$cm^3$ | HC Space Velocity (g/hr)/g | Total Mass Velocity g/($cm^2$ hr) | $H_2O/C$ ratio | $CH_4$ (dry %) | Coking |
| --- | --- | --- | --- | --- | --- | --- | --- | --- | --- | --- |
| 4 | 480 | 7.8 | 65 | 100 | 0.12 | 0.06 | 12.0 | 4.5 | | light |
| 5 | 504 | 6.8 | 65 | 100 | 0.10 | 0.05 | 10.8 | 4.7 | | none |
| 6 | 250 | 8.6 | 65 | 100 | 0.13 | 0.07 | 9.5 | 3.0 | 0.14 | none |
| 7 | 149 | 11.2 | 65 | 100 | 0.17 | 0.09 | 12.0 | 2.9 | | light |
| 8 | 290 | 5.7 | 65 | 100 | 0.09 | 0.07 | 8.3 | 4.2 | | none |
| 9 | 240 | 5.7 | 35 | 65 | 0.16 | 0.07 | 8.3 | 4.2 | 1.09 | none |
| 10 | 336 | 6.0 | 22 | 35 | 0.27 | 0.13 | 8.3 | 4.0 | 2.33 | trace |
| 11 | 504 | 5.7 | 22 | 35 | 0.26 | 0.13 | 6.3 | 3.0 | 3.13 | none |
| 12 | 504 | 5.6 | 22 | 40 | 0.25 | 0.11 | 6.5 | 3.2 | 2.69 | trace |
| 13 | 600 | 6.0 | 28 | 54 | 0.21 | 0.09 | 5.9 | 2.6 | 0.31 | none |
| 14 | 192 | 6.0 | 28 | 54 | 0.21 | 0.09 | 5.9 | 2.6 | | light |
| 15 | 144 | 7.6 | 28 | 91 | 0.27 | 0.07 | 8.4 | 3.0 | 2.65 | trace |
| 16 | 600 | 6 | 28 | 90 | 0.21 | 0.05 | 6.4 | 2.9 | | none |

The results shown in Tables 2 and 3 demonstrate that the sulfur-tolerant catalysts, according to the present invention, give stable performance, substantially without coking, and with substantially complete conversion of even heavy, sulfur-containing hydrocarbon feeds.

Additional representative sulfur-tolerant catalysts of the present invention include, but are not limited to, the following:

TABLE C

| Active Catalyst Phase | Catalyst Promoters and/or Support Phase |
| --- | --- |
| Co | $CeYLaO_x$ |
| Co | $CeSmLaO_x$ |
| Co | $CeGdLaO_x$ |
| Pt | $CeYLaO_x$ |

TABLE C-continued

| Active Catalyst Phase | Catalyst Promoters and/or Support Phase |
|---|---|
| Pt | $CeSmLaO_x$ |
| Rh | $CeYLaO_x$ |
| Rh | $CeSmLaO_x$ |
| $(LaSr)CoO_x$ | $CeYLaO_x$ |
| $(LaSr)CoO_x$ | $CeSmLaO_x$ |

The sulfur tolerant reforming catalyst used in the process of the present invention demonstrates high activity, combined with low weight, as compared to conventional reforming catalysts. These characteristics provide the capability of utilizing the catalyst in the process in a relatively small, lightweight reforming apparatus, useful for mobile operations. The inventive apparatus may be disposed within a vehicle, to provide the reforming process product gases for use as fuel, such as for combustion in a fuel cell capable of providing electrical power. The reforming apparatus according to this embodiment, may advantageously have its outlet communicating with an inlet of the fuel cell.

It should be appreciated that the present invention is not limited to the specific embodiments described above, but includes variations, modifications and equivalent embodiments defined by the following claims.

We claim:

1. A process for steam reforming a sulfur-containing hydrocarbon feed comprising:

providing a sulfur-tolerant catalyst; and, contacting the catalyst with a gas stream comprising steam and a sulfur-containing hydrocarbon feed, wherein sulfur species are present in the hydrocarbon feed in an amount of at least 2 ppm;

the sulfur-tolerant catalyst comprising a mixed oxygen ion conducting and electron conducting material having both an active catalytic phase and a catalyst support phase supporting the active catalyst phase, and optionally a promoter, a) wherein the active catalytic phase is at least one member selected from the group consisting of:

(I) A metal selected from the group consisting of Ag, Co, Cr, Cu, Fe, Ru, Rh, V, and alloys and mixtures thereof; and (II) An oxide of the general formula $M_yM'_{1-y}O_x$, wherein at least one M element is different than at least one M' element, wherein M is selected from the group consisting of Ba, Ce, Nb, Sm, Sr, and mixtures thereof, M' is selected from the group consisting of Ti, Y, Sm, Nb and mixtures thereof, and wherein $0 \leq y \leq 1$ and x is a number sufficient to satisfy the valence requirements of the other elements; and (III) A perovskite of the general formula $(A_{1-a}A'_a)(B_bB'_{1-b})O_{3-c}$, wherein A is selected from the group consisting of lanthanides, La, Y, Pb and mixtures thereof, A' is selected from the group consisting of alkaline earth metals and mixtures thereof, B is selected from the group consisting of transition elements and mixtures thereof, and B' is selected from the group consisting of Al, Co, Cr, Mg, Nb, Ti, Zr and mixtures thereof, wherein $0.9 \leq (A+A')/(B+B') \leq 1.1$; and wherein $0 \leq a \leq 1$; $0 \leq b \leq 1$; and c is a number that renders the composition charge neutral in the absence of an applied potential; and b) wherein the catalyst support phase and the optional promoter, is at least one member selected from the group consisting of:

(IV) An oxide of the general formula $Me_zMe'_{1-z}O_x$, wherein at least one Me element is different than at least one Me' element, wherein Me is selected from the group consisting of Group 2a and 3a (IUPAC) metals, lanthanides, Cr, Fe, In, Nb, Pb, Si, Sn, Ta, Ti, and mixtures thereof, Me' is selected from the group consisting of Al, Bi, Ce, In, Th, U, Zr and mixtures thereof, and wherein $0 \leq z \leq 1$ and x is a number sufficient to satisfy the valence requirements of the other elements; and (V) A perovskite of the general formula $(D_{1-d}D'_d)(E_eE'_{1-e})O_{3-f}$, wherein D is selected from the group consisting of lanthanides, La, Y, and mixtures thereof, D' is selected from the group consisting of alkaline earth metals and mixtures thereof, E is selected from the group consisting of Al, Ce, Co, Mg and mixtures thereof, and E' is selected from the group consisting of transition elements and mixtures thereof, wherein $0.9 \leq (D+D')/(E+E') \leq 1.1$; and wherein $0 \leq d \leq 1$; $0 \leq e \leq 1$; and f is a number that renders the composition charge neutral in the absence of an applied potential; and (VI) A fluorite structure material of the general formula $Ma_{(1-g-h)}Ma'_gMa''_hO_2$ wherein Ma is selected from the group consisting of Th, Zr, Ce, rare earth elements, and mixtures thereof, Ma' is selected from the group consisting of Sc, Ti, Ta, alkaline earth metals, Y, a rare earth element different from Ma, and mixtures thereof, wherein $0<g<0.5$, Ma'' is selected from the group consisting of La, Pr, Nd, Sm, and mixtures thereof, and wherein $0<h<0.2$; and (VII) A pyrochlore structure material of the general formula $Mb_2Mb'_{(2-k)}Mb''_kO_7$ wherein Mb is selected from the group consisting of Ga, Gd, rare earth elements, Y, and mixtures thereof, Mb' is selected from the group consisting of transition metal elements, alkaline earth elements, and mixtures thereof, wherein $0<k<0.5$, and wherein Mb'' is at least one transition metal element different from Mb'; and (VIII) A Brown-Millerite material of the general formula $Mc_2Mc'_2O_5$ wherein Mc is at least one alkaline earth element, and Mc' is selected from the group consisting of Gd, Dy, Ga, and mixtures thereof.

2. The process of claim 1 wherein the catalyst support comprises a catalytic promoter.

3. The process of claim 1 wherein in Formula (III), A' is selected from the group consisting of Ba, Ca, Sr and mixtures thereof.

4. The process of claim 1 wherein in Formula (III), B is selected from the group of transition elements consisting of Fe, Co, Cr, Ni and mixtures thereof.

5. The process of claim 1 wherein $0.99 \leq (A+A')/(B+B') \leq 1.01$.

6. The process of claim 1 wherein, $0.99 \leq (D+D')/(E+E') \leq 1.01$.

7. The process of claim 1 wherein in Formula (V), D' is selected from the group consisting of Ba, Ca, Sr and mixtures thereof.

8. The process of claim 1 wherein in Formula (V), E' is selected from the group consisting of Co, Cr, Cu, Fe, Ni, Zr, and mixtures thereof.

9. The process of claim 1 wherein in Formula (VI), Ma' is selected from the group consisting of Sc, Ti, Ta, Ca, Sr, Ba, Mg, Y, a rare earth element different from Ma, and mixtures thereof.

10. The process of claim 1 wherein in Formula (VII), Mb is selected from the group consisting of Ga, Gd, La, Y, Sm, and mixtures thereof.

11. The process of claim 1 wherein in Formula (VII), Mb' is selected from the group consisting of Zr, Mo, Ti, Fe, Ca, Sr, Ba, Mg, and mixtures thereof.

12. The process of claim 1 wherein in Formula (VII), Mb" is selected from the group consisting of Mo, Ti, Fe, Zr, and mixtures thereof.

13. The process of claim 1 wherein in Formula (VIII), wherein Mc is selected from the group consisting of Ba, Sr, and mixtures thereof.

14. The process of claim 1 wherein the rare earth is Gd.

15. The process of claim 1 wherein the active catalytic phase is a metal according to Formula (I).

16. The process of claim 1, wherein contacting the catalyst with the gas stream is at conditions rendering substantially complete conversion of the hydrocarbon feed.

17. The process of claim 1, wherein coking is substantially absent.

18. The process of claim 1, including communicating with an inlet of a fuel cell, for providing reformed gases to the fuel cell as fuel.

19. The process of claim 1, wherein the lanthanides are selected from the group consisting of La, Ce, Pr, Sm, Gd, and mixtures thereof.

20. A process for steam reforming a sulfur bearing hydrocarbon feed, in a steam reforming apparatus comprising a reaction zone and a, catalyst bed within the reaction zone containing a sulfur-tolerant steam reforming catalyst, the process including introducing steam and a hydrocarbon feed containing at least about 2 ppm sulfur species into the apparatus, and reacting said steam and hydrocarbon feed in the catalyst bed to form reformed gases;

wherein the sulfur tolerant steam reforming catalyst comprises a mixed oxygen ion conducting and electron conducting material having both an active catalytic phase and a catalyst support phase supporting the active catalyst phase, and optionally a promoter, a) wherein the active catalytic phase is at least one member selected from the group consisting of:

(I) A metal selected from the group consisting of Ag, Co, Cr, Cu, Fe, Ru, Rh, V, and alloys and mixtures thereof; and (II) An oxide of the general formula $M_yM'_{1-y}O_x$, wherein at least one M element is different than at least one M' element, wherein M is selected from the group consisting of Ba, Ce, Nb, Sm, Sr, and mixtures thereof, M' is selected from the group consisting of Ti, Y, Sm, Nb and mixtures thereof, and wherein $0 \leq y \leq 1$ and x is a number sufficient to satisfy the valence requirements of the other elements; and (III) A perovskite of the general formula $(A_{1-a}A'_a)(B_bB'_{1-b})O_{3-c}$, wherein A is selected from the group consisting of lanthanides, La, Y, Pb and mixtures thereof, A' is selected from the group consisting of alkaline earth metals and mixtures thereof, B is selected from the group consisting of transition elements and mixtures thereof, and B' is selected from the group consisting of Al, Co, Cr, Mg, Nb, Ti, Zr and mixtures thereof, wherein $0.9 \leq (A+A')/(B+B') \leq 1.1$; and wherein $0 \leq a \leq 1$; $0 \leq b \leq 1$; and c is a number that renders the composition charge neutral in the absence of an applied potential; and b) wherein the catalyst support phase and the optional promoter, is at least one member selected from the group consisting of:

(IV) An oxide of the general formula $Me_zMe'_{1-z}O_x$, wherein at least one Me element is different than at least one Me' element, wherein Me is selected from the group consisting of Group 2a and 3a (IUPAC) metals, lanthanides, Cr, Fe, In, Nb, Pb, Si, Sn, Ta, Ti, and mixtures thereof, Me' is selected from the group consisting of Al, Bi, Ce, In, Th, U, Zr and mixtures thereof, and wherein $0 \leq z \leq 1$ and x is a number sufficient to satisfy the valence requirements of the other elements; and (V) A perovskite of the general formula $(D_{1-d}D'_d)(E_eE'_{1-e})O_{3-f}$, wherein D is selected from the group consisting of lanthanides, La, Y, and mixtures thereof, D' is selected from the group consisting of alkaline earth metals and mixtures thereof, E is selected from the group consisting of Al, Ce, Co, Mg and mixtures thereof, and E' is selected from the group consisting of transition elements and mixtures thereof, wherein $0.9 \leq (D+D')/(E+E') \leq 1.1$; and wherein $0 \leq d \leq 1$; $0 \leq e \leq 1$; and f is a number that renders the composition charge neutral in the absence of an applied potential; and (VI) A fluorite structure material of the general formula $Ma_{(1-g-h)}Ma'_gMa''_hO_2$ wherein Ma is selected from the group consisting of Th, Zr, Ce, rare earth elements, and mixtures thereof, Ma' is selected from the group consisting of Sc, Ti, Ta, alkaline earth metals, Y, a rare earth element different from Ma, and mixtures thereof, wherein $0<g<0.5$, Ma" is selected from the group consisting of La, Pr, Nd, Sm, and mixtures thereof, and wherein $0<h<0.2$; and (VII) A pyrochlore structure material of the general formula $Mb_2Mb'_{(2-k)}Mb''_kO_7$ wherein Mb is selected from the group consisting of Ga, Gd, rare earth elements, Y, and mixtures thereof, Mb' is selected from the group consisting of transition metal elements, alkaline earth elements, and mixtures thereof, wherein $0<k<0.5$, and wherein Mb" is at least one transition metal element different from Mb'; and (VIII) A Brown-Millerite material of the general formula $Mc_2Mc'_2O_5$ wherein Mc is at least one alkaline earth element, and Mc' is selected from the group consisting of Gd, Dy, Ga, and mixtures thereof.

21. The process according to claim 20, wherein the apparatus has an outlet communicating with an inlet of a fuel cell, including feeding the reformed gases to the fuel cell as fuel.

* * * * *